(12) United States Patent
Howe

(10) Patent No.: US 11,438,363 B2
(45) Date of Patent: Sep. 6, 2022

(54) NETWORK EXPOSURE DETECTION AND SECURITY ASSESSMENT TOOL

(71) Applicant: Zscaler, Inc., San Jose, CA (US)

(72) Inventor: Nathan Howe, Frankfurt (DE)

(73) Assignee: Zscaler, Inc., San Jose, CA (US)

( * ) Notice: Subject to any disclaimer, the term of this patent is extended or adjusted under 35 U.S.C. 154(b) by 259 days.

(21) Appl. No.: 16/839,120

(22) Filed: Apr. 3, 2020

(65) Prior Publication Data

US 2021/0314338 A1 Oct. 7, 2021

(51) Int. Cl.
*H04L 9/00* (2022.01)
*H04L 9/40* (2022.01)
*H04L 41/22* (2022.01)

(52) U.S. Cl.
CPC .......... *H04L 63/1433* (2013.01); *H04L 41/22* (2013.01); *H04L 63/1416* (2013.01); *H04L 63/1425* (2013.01); *H04L 63/20* (2013.01)

(58) Field of Classification Search
CPC ............ H04L 63/1433; H04L 63/1425; H04L 63/1416; H04L 41/22
USPC .......................................................... 726/25
See application file for complete search history.

(56) References Cited

U.S. PATENT DOCUMENTS

| | | | |
|---|---|---|---|
| 7,894,350 B2 | 2/2011 | Kailash et al. | |
| 8,286,239 B1 | 10/2012 | Sutton | |
| 8,478,708 B1 | 7/2013 | Larcom | |
| 8,484,726 B1 | 7/2013 | Sutton | |
| 8,763,120 B1 | 6/2014 | Forristal | |
| 9,065,850 B1 | 6/2015 | Sobrier | |
| 9,294,498 B1* | 3/2016 | Yampolskiy | H04L 67/10 |
| 9,641,547 B2* | 5/2017 | Yampolskiy | H04L 29/12066 |
| 10,142,362 B2 | 11/2018 | Weith et al. | |
| 10,225,740 B2 | 3/2019 | Bansal et al. | |
| 10,511,607 B2 | 12/2019 | Bansal et al. | |
| 2013/0339514 A1 | 12/2013 | Crank et al. | |
| 2015/0207809 A1* | 7/2015 | Macaulay | H04L 63/1433 726/22 |
| 2017/0359220 A1 | 12/2017 | Weith et al. | |
| 2019/0081961 A1 | 3/2019 | Bansal | |
| 2019/0081981 A1 | 3/2019 | Bansal | |
| 2019/0319972 A1 | 10/2019 | Desai | |
| 2020/0374316 A1* | 11/2020 | Crabtree | G06F 16/2477 |
| 2021/0144168 A1* | 5/2021 | Vester | H04L 63/20 |

* cited by examiner

*Primary Examiner* — Christopher J Brown
(74) *Attorney, Agent, or Firm* — Clements Bernard Baratta; Lawrence A. Baratta, Jr.

(57) ABSTRACT

Systems and methods include receiving a domain of interest; performing an analysis of the domain to extract namespaces of the domain, hosts associated with the domain, subdomains associated with the domain, namespaces of the subdomains, and addresses including address ranges of any identified namespaces; performing a Common Vulnerabilities and Exposures (CVE) search based on the analysis to identify a CVE list associated with the domain; determining weightings of the namespaces of the domain and the subdomains to provide a name list; obtaining cloud monitoring content associated with the domain; and utilizing the name list, the CVE list, and the cloud monitoring content to determine a risk associated with the domain.

18 Claims, 13 Drawing Sheets

403

| Parent Domain | Subdomain |
|---|---|
| xyz.com | abc.xyz.com |
| xyz.com | vpn.xyz.com |
| xyz.com | admin.xyz.com |

405

| Parent Domain | Subdomain | Reverse lookup |
|---|---|---|
| xyz.com | abc.xyz.com | 1.2.3.4 |

407

| Parent Domain | Subdomain | Reverse lookup | ASN |
|---|---|---|---|
| xyz.com | abc.xyz.com | 1.2.3.4 | 5.6.7.8 |

409

| Parent Domain | Subdomain | Reverse lookup | ASN | Hosting ID |
|---|---|---|---|---|
| xyz.com | abc.xyz.com | 1.2.3.4 | 5.6.7.8 | Host.com |

411

| Parent Domain | Subdomain | Reverse lookup | ASN | Hosting ID | OS | Ports | Product | Banner | Vulnerability |
|---|---|---|---|---|---|---|---|---|---|
| xyz.com | abc.xyz.com | 1.2.3.4 | 5.6.7.8 | Host.com | OS | 80 | Apache | Apache | 10 |

413

| Parent Domain | Subdomain | Reverse lookup | ASN | Hosting ID | OS | Ports | Product | Banner | Vulnerability | Risk |
|---|---|---|---|---|---|---|---|---|---|---|
| xyz.com | abc.xyz.com | 1.2.3.4 | 5.6.7.8 | Host.com | OS | 80 | Apache | Apache | 10 | High |

FIG. 5

How it works?

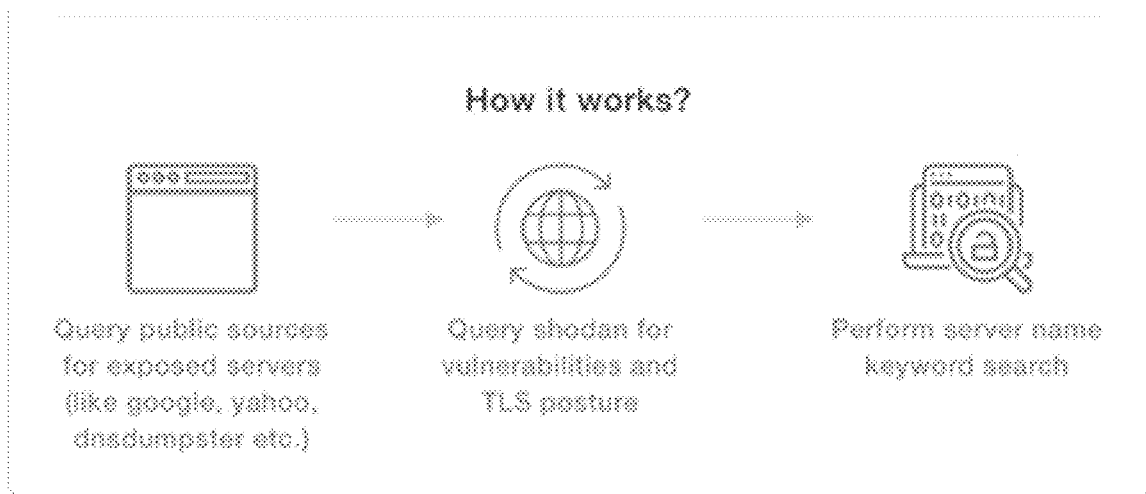

Query public sources for exposed servers (like google, yahoo, dnsdumpster etc.) → Query shodan for vulnerabilities and TLS posture → Perform server name keyword search

Attack Surface Assessment Details

Known Vulnerabilities   393 known vulnerabilities

Here's a list of known vulnerabilities existing in your servers exposed to the internet. This information is exposed and easily available to bad actors. You will also find the associated known CVEs for each of these vulnerable servers.

| Name | IP | Product | Vulnerabilities |
|---|---|---|---|
| ci.acmecorp.com | 219.160.230.129 | Apache httpd | CVE-2010-2068 |
| | | | CVE-2011-4317 |
| | | | CVE-2017-7679 |
| | | | CVE-2011-3368 |
| | | | CVE-2011-3348 |
| | | | CVE-2012-3499 |
| | | | CVE-2012-4558 |
| | | | CVE-2013-1896 |
| | | | CVE-2016-8612 |
| | | | CVE-2012-4557 |
| | | | CVE-2014-0098 |
| | | | CVE-2017-7668 |
| | | | CVE-2013-6438 |
| | | | CVE-2012-2687 |
| | | | CVE-2011-4415 |
| | | | CVE-2012-0031 |

FIG. 14

NETWORK EXPOSURE DETECTION AND SECURITY ASSESSMENT TOOL

FIELD OF THE DISCLOSURE

The present disclosure relates generally to networking and computing. More particularly, the present disclosure relates to systems and methods for a network exposure detection and security assessment tool.

BACKGROUND OF THE DISCLOSURE

Network (cyber) security is critical to enterprises. The enterprise Information Technology (IT) environment has evolved, expanding from a centralized data center approach to a more cloud and mobile-centric model. This evolution will continue where employees work remotely. Simply put, there is no longer a corporate, secure network. Also, attackers have adjusted their tactics, shifting from the services in the data center to individual users and web browsers as well as developing cyberattacks that elude traditional signature-based detection. Unfortunately, enterprises have largely failed to keep pace with these changes, continuing to use dated techniques to thwart attacks and appliance-based security infrastructure to protect an increasingly cloud and mobile-centric workplace. As a result, despite costly on-premise internet security solutions, many enterprises find vulnerabilities in their current infrastructure.

Further, IT simply does not have visibility into the myriad of vulnerabilities. Example vulnerabilities include, without limitation, Cross-site scripting (XSS) attacks, malicious code, phishing attacks, malicious websites, malware in zipped (compressed) and executable files, browser cookie stealing, executable file downloads sensitive data leaks including credit card data, intellectual property, U.S. social security numbers, etc., embargoed websites in countries designated by the United States and/or European Union, and the like. IT simply cannot remediate or mitigate vulnerabilities without some visibility into areas of focus. IT resources are not infinite. As such, it would be advantageous to provide a meaningful analysis of network exposure to vulnerabilities and security assessment thereto, with an objective of remediation and mitigation.

BRIEF SUMMARY OF THE DISCLOSURE

The present disclosure relates to systems and methods for a network exposure detection and security assessment tool. The tool described herein collects, analyzes, and displays information related to an entity's Internet-facing environment. Further, the tool provides recommendations and actions for remediation and mitigation. In that process, the tool determines any open Internet services available externally, a risk of these services, details about the risks and the services, a meaningful rating for comparisons, and actions. An objective of the tool is to highlight the need for Zero Trust Network Access (ZTNA), which is a security framework that does not trust any entity.

In an embodiment, the present disclosure includes a computer-implemented method and a non-transitory computer-readable storage medium having computer-readable code stored thereon for programming one or more processors to perform steps. The steps and the method can include receiving a domain of interest; performing an analysis of the domain to extract namespaces of the domain, hosts associated with the domain, subdomains associated with the domain, namespaces of the subdomains, and addresses including address ranges of any identified namespaces; performing a Common Vulnerabilities and Exposures (CVE) search based on the analysis to identify a CVE list associated with the domain; determining weightings of the namespaces of the domain and the subdomains to provide a name list; obtaining cloud monitoring content associated with the domain; and utilizing the name list, the CVE list, and the cloud monitoring content to determine a risk associated with the domain.

The steps can include displaying the risk in a summarized manner in a User Interface with associated details of the name list, the CVE list, and the cloud monitoring content; and providing one or more remediation actions based on the risk. The weightings of the namespaces can include predetermine weights based on a hostname. The addresses including the address ranges can be utilized to identify exposed servers. The analysis can utilize open source intelligence (OSINT) sources. The steps can further include performing one or more security tests, wherein the risk associated with the domain is based on the domain and the one or more security tests provide a risk associated with a device whether on or off the domain. The analysis can include subdomain enumeration, reverse lookups, Autonomous System Name (ASN) lookup, and hosting lookup.

In another embodiment, an apparatus includes a network interface communicatively coupled to a network; a processor communicatively coupled to the network interface; and memory storing computer-executable instructions that, when executed, cause the processor to receive a domain of interest; perform an analysis of the domain to extract namespaces of the domain, hosts associated with the domain, subdomains associated with the domain, namespaces of the subdomains, and addresses including address ranges of any identified namespaces; perform a Common Vulnerabilities and Exposures (CVE) search based on the analysis to identify a CVE list associated with the domain; determine weightings of the namespaces of the domain and the subdomains to provide a name list; obtain cloud monitoring content associated with the domain; and utilize the name list, the CVE list, and the cloud monitoring content to determine a risk associated with the domain.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a user device which may be used in the cloud-based system of FIG. 1 or the like;

FIG. 5 is a diagram of an example implementation of the process of FIG. 4;

FIGS. 12-14 are screenshots of an output UI for the threat assessment process of FIG. 7.

DETAILED DESCRIPTION OF THE DISCLOSURE

Again, the present disclosure relates to systems and methods for a network exposure detection and security assessment tool. The tool described herein collects, analyzes, and displays information related to an entity's Internet-facing environment. Further, the tool provides recommendations and actions for remediation and mitigation. In that process, the tool determines any open Internet services available externally, a risk of these services, details about the risks and the services, a meaningful rating for comparisons, and actions. An objective of the tool is to highlight the need for Zero Trust Network Access (ZTNA), which is a security framework that does not trust any entity.

Example Cloud System Aarchitecture

Figure 1:
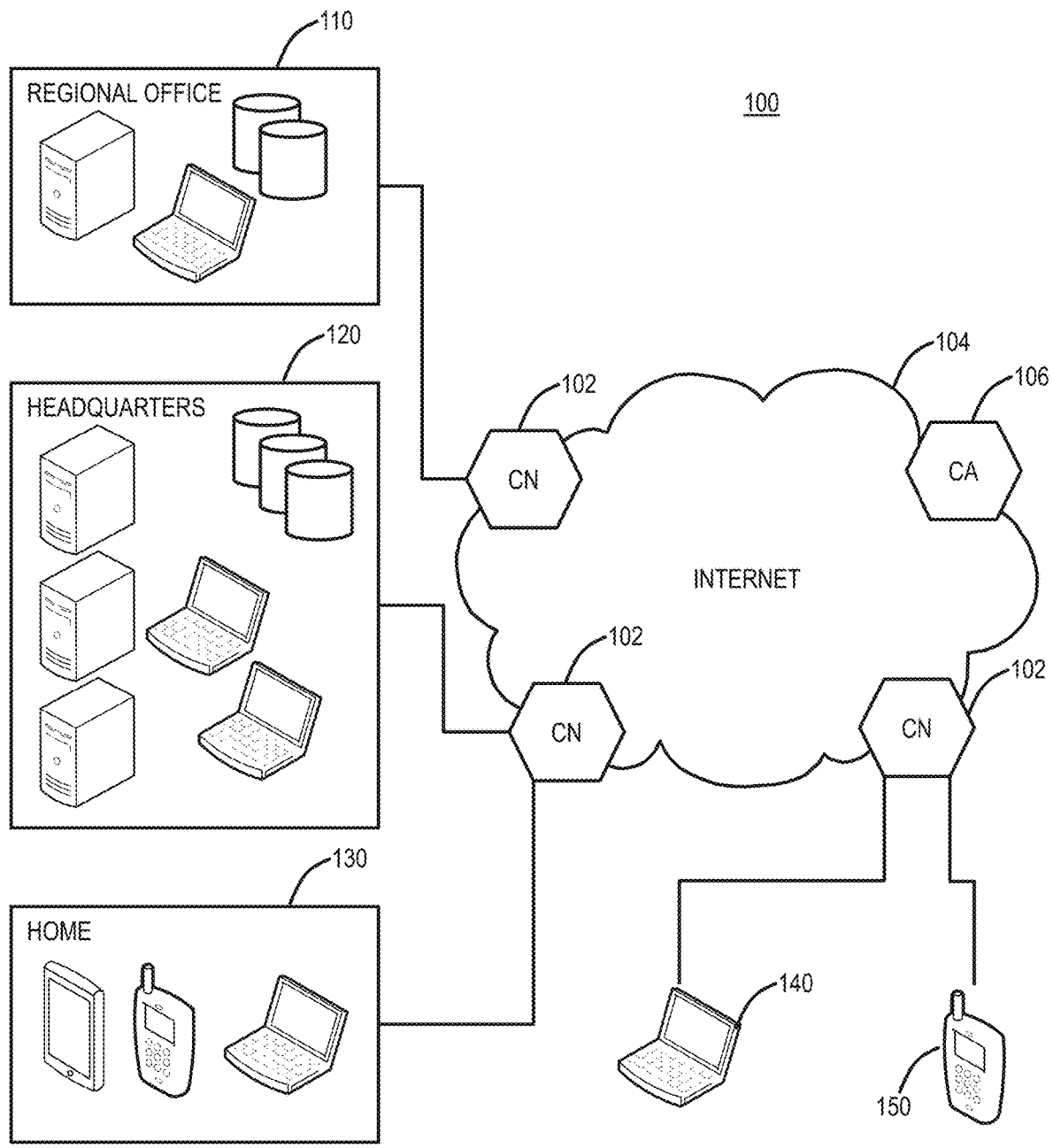
FIG. 1 is a network diagram of a cloud-based system for implementing various cloud-based services.
Figure 2:
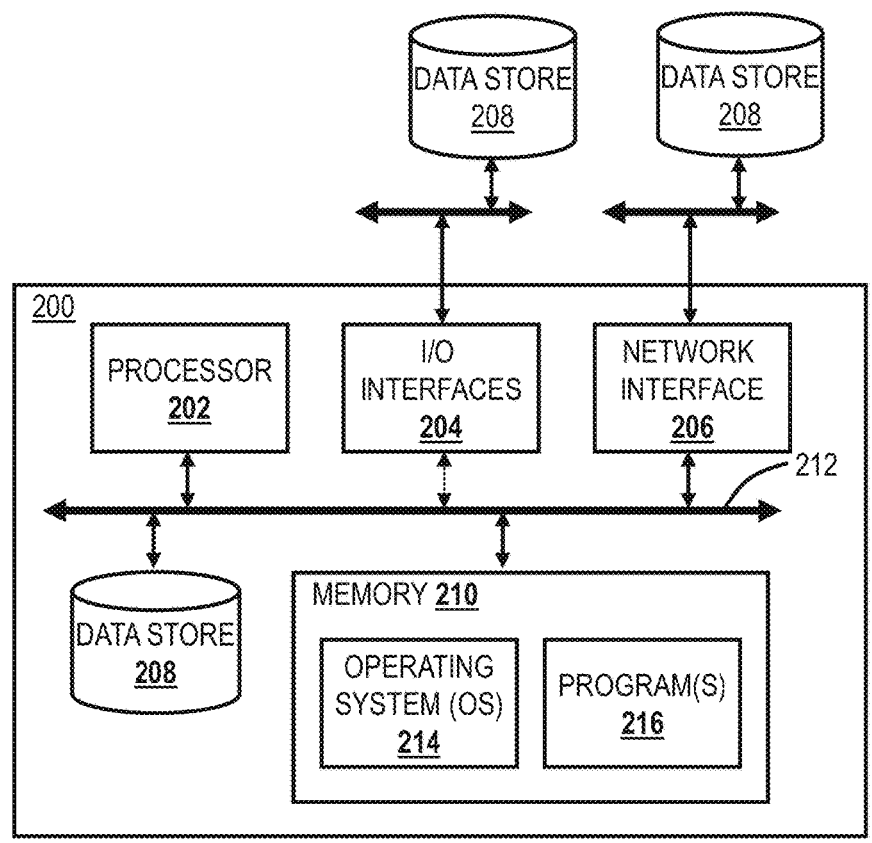

FIG. 1 is a network diagram of a cloud-based system 100 for implementing various cloud-based services. The cloud-based system 100 includes one or more Cloud Nodes (CN) 102 communicatively coupled to the Internet 104 or the like. The cloud nodes 102 may be implemented as a server 200 (as illustrated in FIG. 2) or the like and can be geographically diverse from one another, such as located at various data centers around the country or globe. Further, the cloud-based system 100 can include one or more Central Authority (CA) nodes 106, which similarly can be implemented as the server 200 and be connected to the cloud nodes 102. For illustration purposes, the cloud-based system 100 can connect to a regional office 110, headquarters 120, various employee's homes 130, laptops/desktops 140, and mobile devices 150, each of which can be communicatively coupled to one of the cloud nodes 102. These locations 110, 120, 130, and devices 140, 150 are shown for illustrative purposes, and those skilled in the art will recognize there are various access scenarios to the cloud-based system 100, all of which are contemplated herein. The devices 140, 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services such as Software as a Service (SaaS), platform as a service, infrastructure as a service, security as a service, Virtual Network Functions (VNFs) in a Network Functions Virtualization (NFV) Infrastructure (NFVI), etc. to the locations 110, 120, 130 and devices 140, 150. Previously, the Information Technology (IT) deployment model included enterprise resources and applications stored within an enterprise network (i.e., physical devices), behind a firewall, accessible by employees on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored via redirection, a proxy, traffic forwarding, etc. to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, Uniform Resource Locator (URL) filtering, antivirus protection, bandwidth control, Data Leakage Prevention (DLP), zero-day vulnerability protection, web 2.0 features, and the like. In an embodiment, the cloud-based system 100 may be viewed as security as a service through the cloud. For example, the cloud-based system 100 can be used to block or allow access to web sites, implement policy, protect against malware, provide DLP, etc.

Figure 3:
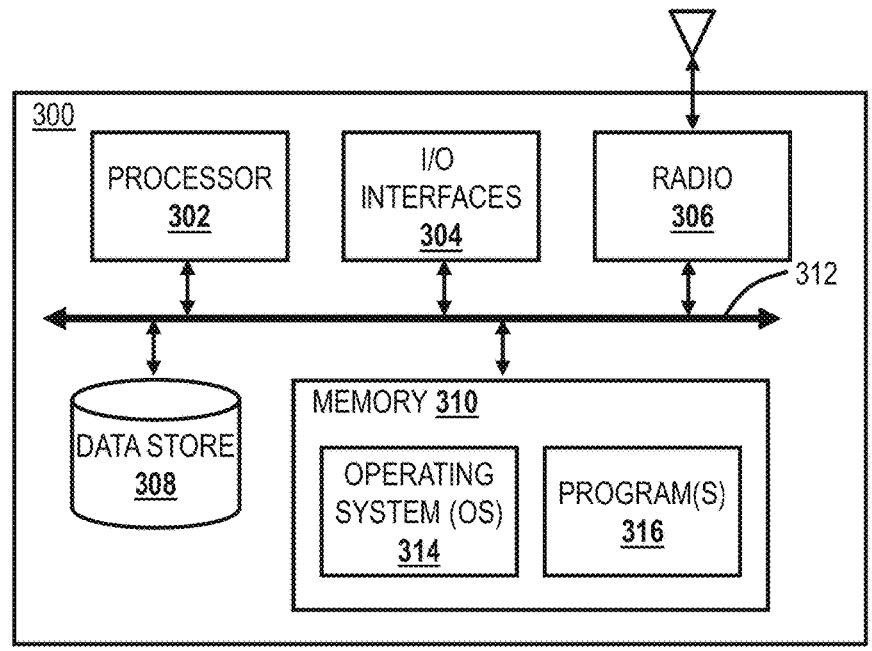

That is, the cloud-based system 100 can be configured to provide device security and policy systems and methods. The laptops/desktops 140, the mobile device 150, as well as various devices at the locations 110, 120, 130 may be a user device 300 (as illustrated in FIG. 3) and may include common devices such as laptops, smartphones, tablets, netbooks, personal digital assistants, MP3 players, cell phones, e-book readers, Internet of Things (IoT) devices, and the like. The cloud-based system 100 can be configured to provide security and policy enforcement for devices. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud before delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up to date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users, which is dynamically available at the cloud nodes 102, etc.

The cloud nodes 102 can proactively detect and preclude the distribution of security threats, e.g., malware, spyware, viruses, email spam, DLP, content filtering, suspicious behavior, etc., and other undesirable content sent from or requested by the user device 300. The cloud nodes 102 can also log activity and enforce policies, including logging changes to the various components and settings. The cloud nodes 102 can be communicatively coupled to the user devices 300, providing in-line monitoring. The connectivity between the cloud nodes 102 and the user devices 300 may be via a tunnel (e.g., using various tunneling protocols such as Generic Routing Encapsulation (GRE), Layer Two Tunneling Protocol (L2TP), or other Internet Protocol (IP) security protocols may be used. Alternatively, the connectivity may be via a user application on the user device 300 that is configured to selectively forward traffic through the cloud nodes 102.

That is, there are various techniques to forward traffic between users (locations 110, 120, 130, devices 140, 150) and the cloud-based system 100. Typically, the locations 110, 120, 130 can use tunneling where all traffic is forward, and the devices 140, 150 can use an application, proxy, Secure Web Gateway (SWG), etc. Additionally, the cloud-based system 100 can be multi-tenant in that it operates with multiple different customers (enterprises), each possibly including different policies and rules. One advantage of the multi-tenancy and a large volume of users is the zero-day/zero-hour protection in that a new vulnerability can be detected and then instantly remediated across the entire cloud-based system 100. Another advantage of the cloud-based system 100 is the ability for the central authority nodes 106 to instantly enact any rule or policy changes across the cloud-based system 100. As well, new features in the cloud-based system 100 can also be rolled up simultaneously across the user base, as opposed to selective upgrades on every device at the locations 110, 120, 130, and the devices 140, 150.

The central authority nodes 106 can store policy data for each organization and can distribute the policy data to each of the cloud nodes 102. The central authority nodes 106 can also distribute threat data that includes the classifications of content items according to threat classifications, e.g., a list of known viruses, a list of known malware sites, spam email domains, a list of known phishing sites, a DLP dictionary, etc. The conventional deployment relied on physical devices located at the perimeter of the enterprise network. The cloud-based system 100 removes the need for such devices as well as the management thereof and provides security anywhere, anytime, on any system.

As described herein, the terms cloud services and cloud applications may be used interchangeably. A cloud service is any service made available to users on-demand via the Internet, such as via the cloud-based system 100 as opposed to being provided from a company's own on-premises servers. A cloud application, or cloud app, is a software program where cloud-based and local components work together. Example cloud services include Zscaler Internet Access (ZIA), Zscaler Private Access (ZPA), and Zscaler Digital Experience (ZDX), from Zscaler, Inc. (the assignee and applicant of the present application). The ZIA service can include firewall, threat prevention, Deep Packet Inspection (DPI), DLP, content filtering, and the like. The ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources in lieu of traditional Virtual Private Networks (VPNs), namely ZPA provides ZTNA. Those of ordinary skill in the art will recognize various other types of cloud services are also contemplated. In fact, the trend is for all computing services to move to the cloud include, for example, document management, file storage, Customer Relationship Management (CRM), email, billing, finance, etc. In the context of these services, a provider of such cloud services can be referred to as a cloud provider, a SaaS provider, etc., and may utilize a hardware architecture similar to the cloud-based system 100. Of course, other types of cloud architectures are also contemplated, with the cloud-based system 100 presented for illustration purposes.

Logically, as a distributed security system, the cloud-based system 100 can be viewed as an overlay network between users (at the locations 110, 120, 130, and the devices 140, 150) and the Internet 140. As mentioned herein, the conventional security approach relies upon physical devices and/or appliances located at the perimeter of the enterprise network. As an ever-present overlay network, the cloud-based system 100 can provide the same functions as the physical devices and/or appliances regardless of geography or location of the users(at the locations 110, 120, 130 and the devices 140, 150), as well as independent of platform, operating system, network access technique, network access provider, etc.

Example server architecture

FIG. 2 is a block diagram of a server 200, which may be used in the cloud-based system 100, in other systems, or standalone. For example, the cloud nodes 102 and the central authority nodes 106 may be formed as one or more of the servers 200. The server 200 may be a digital computer that, in terms of hardware architecture, generally includes a processor 202, Input-Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Example User Device Architecture

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Threat assessment

The present disclosure includes a so-called Open Source Intelligence tool, threat assessment tool, or simply a tool, that collects and analyzes information related to an entity's network and exposure with the information being public, or open. Further, the tool performs the testing in a controlled manner so that the entity's network is not at risk from any vulnerabilities in the testing. As described herein, an entity can include an enterprise, a private network, etc., namely any network that has a domain exposed to the Internet. For example, the entity can include the headquarters 120, the regional office 110, etc. Generally, the entity includes any addressable network, such as via an IP address, top level domain name or fully qualified domain name.

Figure 4:
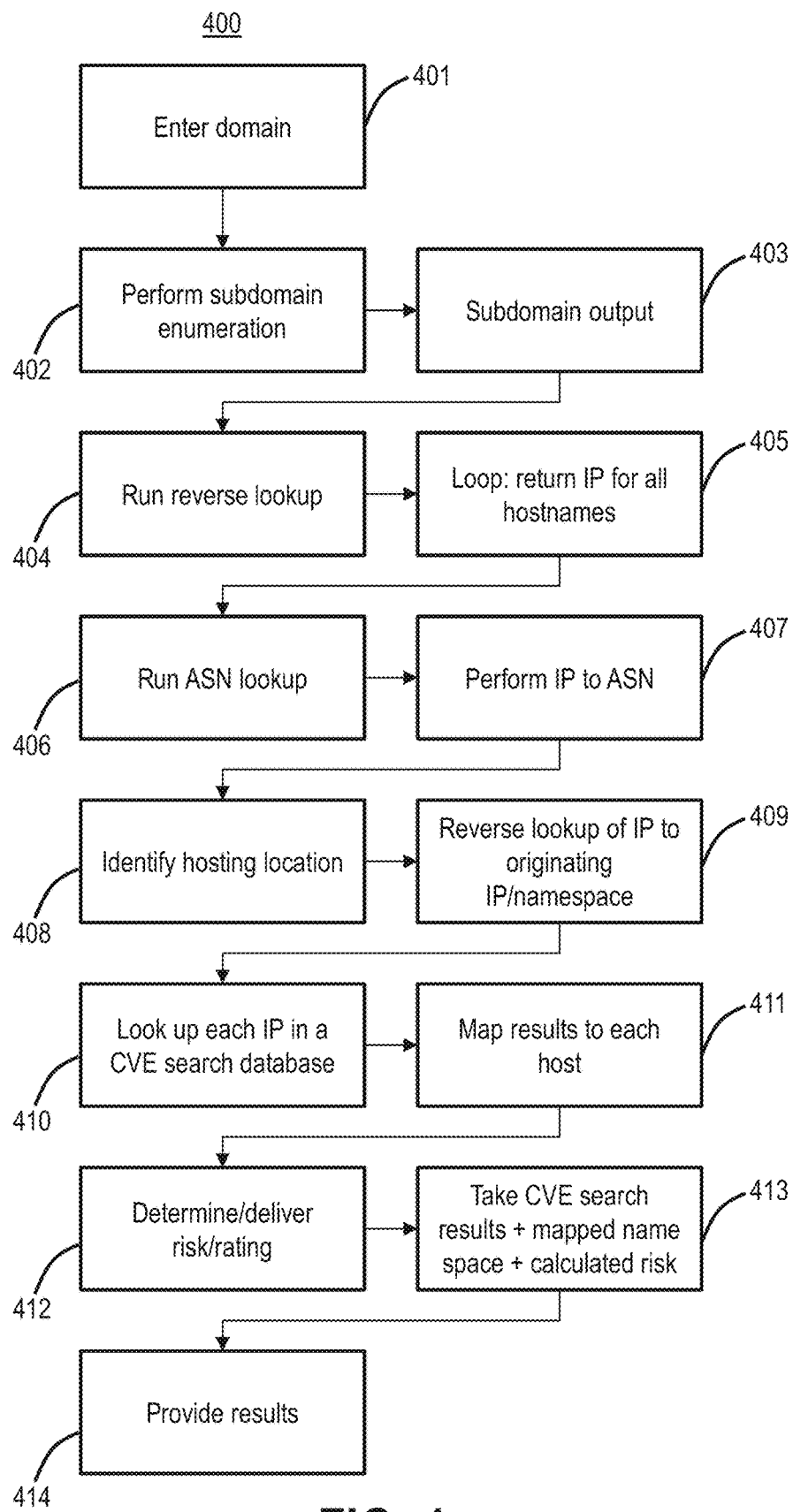
FIG. 4 is a flowchart of a process illustrating a flow of a threat assessment tool.

FIG. 4 is a flowchart of a process 400 illustrating a flow of a threat assessment tool. FIG. 5 is a diagram of an example implementation of the process 400. The process 400 contemplates operation as a computer-implemented method, via the server 200, and/or as computer-readable code stored in a non-transitory computer-readable medium. The process 400 includes receiving a domain (step 401). Here, a user can input a domain that is going to be analyzed for threat assessment. For example, the domain can be input simply as a domain name in a Fully Qualified Domain Name (FQDN), e.g., xyz.com, as illustrated in the example of FIG. 5.

Next, the process 400 includes performing subdomain enumeration (step 402), and providing an output of all subdomains associated with the domain (step 403). Subdomain enumeration utilizes open-source intelligence (OSINT) to enumerate subdomains associated with the domain. OSINT is data collected from publicly available sources to be used in an intelligence context. In an embodiment, the subdomain enumeration is performed using sublist3r (available online at tools.kali.org/information-gathering/sublist3r). Sublist3r is a python tool designed to enumerate subdomains of websites using OSINT. It helps penetration testers and bug hunters collect and gather subdomains for the domain they are targeting. Sublist3r enumerates subdomains using many search engines such as Google, Yahoo, Bing, Baidu, and Ask. Sublist3r also enumerates subdomains using Netcraft, Virustotal, ThreatCrowd, DNSdumpster, and ReverseDNS. In FIG. 5, the example domain xyz.com returns example subdomains of abc.xyz.com, vpn.xyz.com, and admin.xyz.com.

Next, the process 400 includes performing a reverse lookup of the domain and all enumerated subdomains (step 404), and returning IP addresses for all hostnames (step 405). A reverse lookup provides the IP address for a given domain and can be based on various known Domain Name System (DNS) databases and approaches. In FIG. 5, the example domain xyz.com returns a reverse lookup of 1.2.3.4. Note, for illustration purposes, the remainder of FIG. 5 only illustrates details for the example subdomain abc.xyz.com. Those of ordinary skill in the art will appreciate all of the subdomains for xyz.com can be analyzed.

Next, the process 400 includes performing an Autonomous System Name (ASN) lookup (step 406), and performing an IP to ASN conversion, for each of the domain and all enumerated subdomains (step 407). Autonomous Systems (AS) are routable networks within the public Internet, administered by the local Regional Internet Registries (RIRs) and assigned to owners of networks. There are various ASN Information tools that display information about an IP address's Autonomous System Number (ASN) such as IP owner, registration date, issuing registrar, and the max range of the AS with total IPs. In FIG. 5, the example domain xyz.com returns an ASN lookup of 5.6.7.8.

Next, the process 400 includes identifying a hosting location (step 408), and performing a reverse lookup of IP to originating IP/namespace (step 409). Here, the hosting location is identified, e.g., aws.hosting.amazon.dcomn, or simply host.com, as illustrated in the example of FIG. 5.

Next, the process 400 includes performing a lookup of each IP address in a Common Vulnerabilities and Exposures (CVE) search database (step 410), and maps results to each host (step 411). Each CVE includes a unique, common identifier for publicly known information-security vulnerabilities in publicly released software packages. In an embodiment, the CVE search database can include Shodan.io. In FIG. 5, various information is illustrated from the searches for the example subdomain abc.xyz.com, such as Operating System (OS), ports (e.g., port 80), product (e.g., Apache), banner (e.g., Apache), and vulnerabilities (e.g., 10).

Next, the process 400 includes determining, delivering the risk/rating (step 412), taking the CVE search reports, mapped namespace, and calculated risk (step 413), and providing the results (step 414). For example, in FIG. 5, it is determined that abc.xyz.com has High risk.

Threat Assessment Weighting Process

Figure 6:
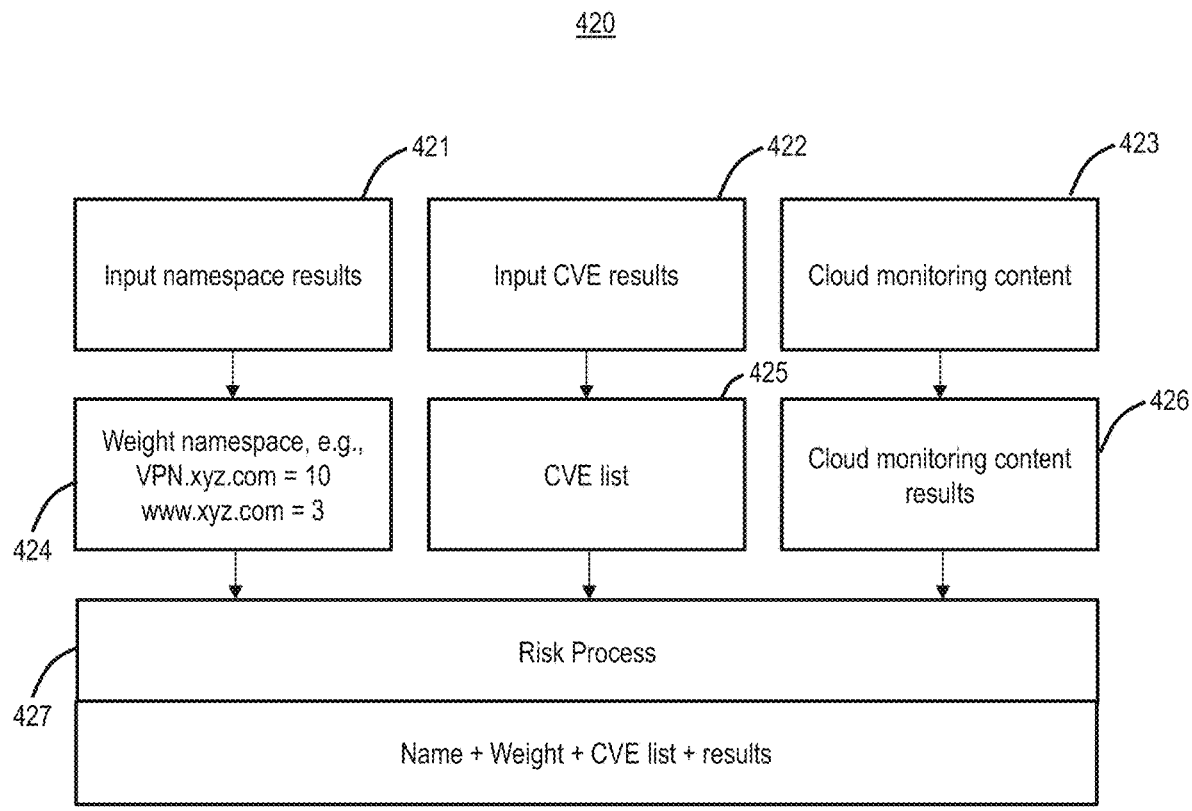
FIG. 6 is a flowchart of a threat assessment weighting process, for the process of FIG. 4.

FIG. 6 is a flowchart of a threat assessment weighting process 420. The objective of the process 420 is to derive a meaningful value to assess the threats based on information gathered in the process 400. The threat assessment weighting process 420 utilizes three general inputs—namespace results (step 421), CVE results (step 422), and cloud monitoring content (step 423). The namespace results and the CVE results are as described in FIGS. 4 and 5. The namespace results can be heuristically determined. Each namespace for the domain can be given a weight (step 424). For example, a namespace of VPN.xyz.com can have a weight of '10' whereas a namespace of www.xyz.com can have a weight of '3,' meaning a VPN domain has more potential for threats than a www domain. The CVE results can be a list from the process 400 (step 425). Coupling the exposed, risky name with the identified CVE will allows for riskier instances. For example a VPN service named vpn.xyz.com with a high CVE will be riskier and thus scored as such, when compared to vpn.xyz.com with a low (or no) CVE. Both VPN services are still risky as they are exposed to the entirety of the Interent. However it is the VPN service with the hight CVE score that would score a "riskier score." The following table provides some examples of namespace weighting:

| Identified FQDN | Type | What the exposure means |
| --- | --- | --- |
| SAP_FR303.xyz.com | Infrastructure | Exposed SAP |
| customername.customer.portal.xyz.com | Business Information | Exposed customer |
| Joes-iphone.xyz.com | Company exposure | Board Member device |
| Marys-android.xyz.com | Company exposure | Board Member device |
| 8332rtr.xyz.com | Infrastructure | Exposed Router |
| gw_fw01.xyz.com | Infrastructure | Exposed Firewall |
| dev-test01.xzy.com | Development | Exposed Development |
| logfs.nc3a.xyz.com | Infrastructure | Exposed Logging |
| b2bportal.xyz.com | Partner connection | Exposed Logging |

Further, the threat assessment weighting process 420 can include input from cloud monitoring, namely cloud monitoring content results (step 426). The cloud monitoring content results can be from the cloud-based system 100 operating as a distributed security system. Here, the cloud-based system 100 has valuable insights of a domain (and associated subdomains) based on ongoing monitoring of various users. For example, the cloud-based system 100 can monitor millions or even billions of requests every day, all of which are users going to services on the Internet. Of note, many of these destinations are not in the set of OSINT sources, used for the CVE results or weighted namespaces. Leveraging this data set enables discovery and testing of more domains for exposure. In addition, the cloud-based system 100 is also performing monitoring and risk definition of traffic, which allows for protection and blocking of traffic to these identified services. This information set, included in the allows for new levels of identification and risk categorization.

Finally, the inputs 421, 422, 423 and their weighted results 424, 425, 426 are combined in a risk process 427. The risk rating can be computed based on the following information sources:

Name of service (weighted namespace);
Type of service this name falls into, e.g., infrastructure/remote access;
The CVE rating of that service; and
Additional risk insights identified by the cloud-based system 100.

The weighting should be applied based upon categorization of the application, e.g., an exposed SAP (infrastructure) would be weighted higher versus an exposed web service (public service). This weighting can be adjusted by the identification and categorization of the CVE, e.g., SAP with no vulnerabilities (today) will be less risky than a vulnerabie web server. The key point is that any exposure is still risky. It is the level of the risk that should be categorized in order to prioritise actions for the consumer of the report.

Threat assessment process and example

Figure 7:
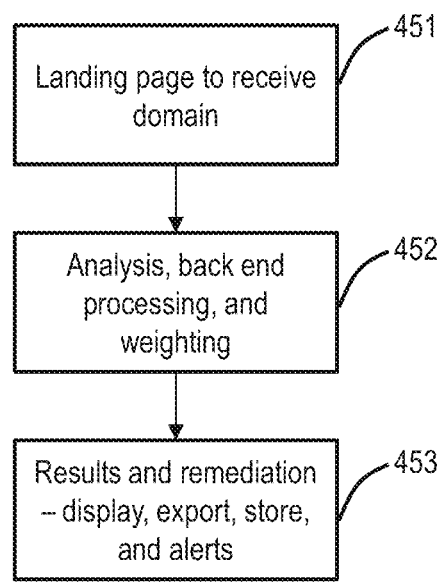
FIG. 7 is a flowchart of another process for threat assessment.
Figure 8:
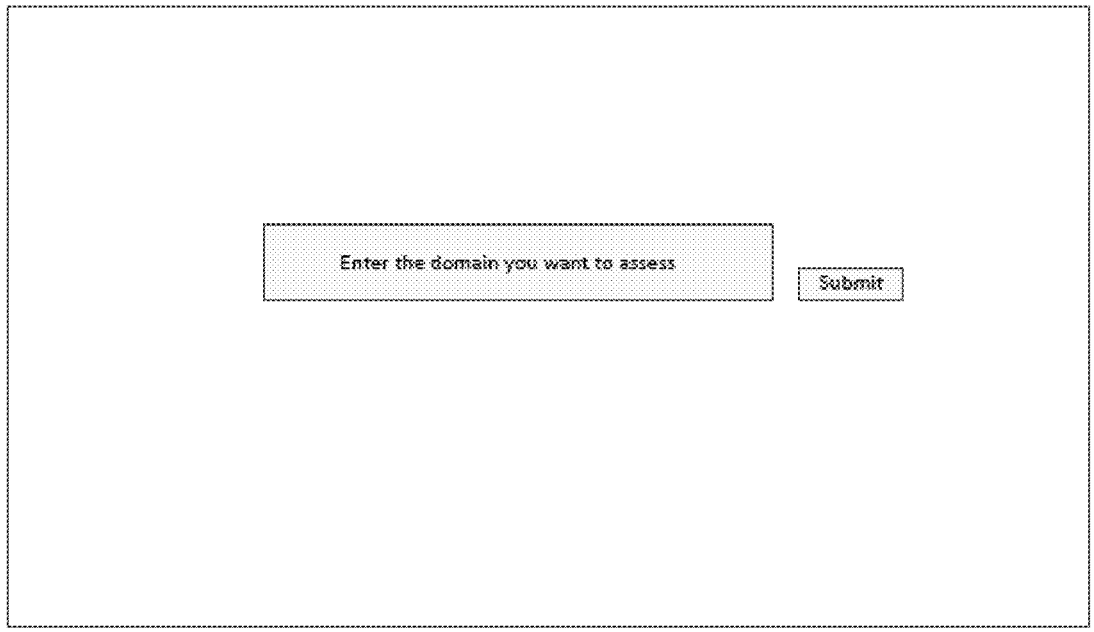
FIGS. 8 and 9 are screenshots of a User Interface (UI) for the threat assessment process of FIG. 7.
Figure 9:
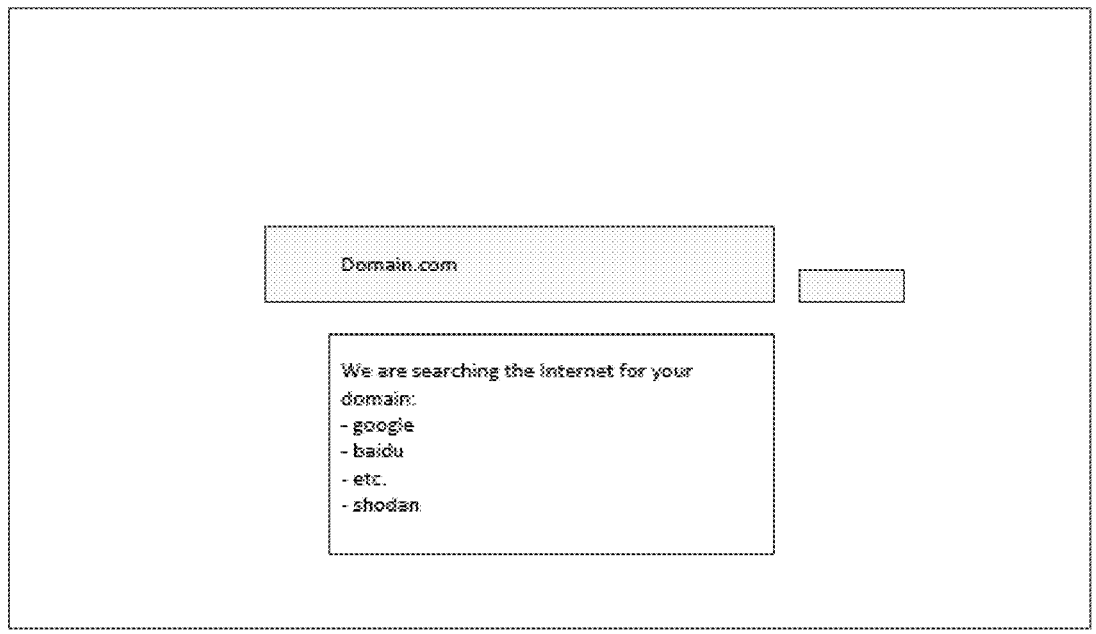
Figure 10:
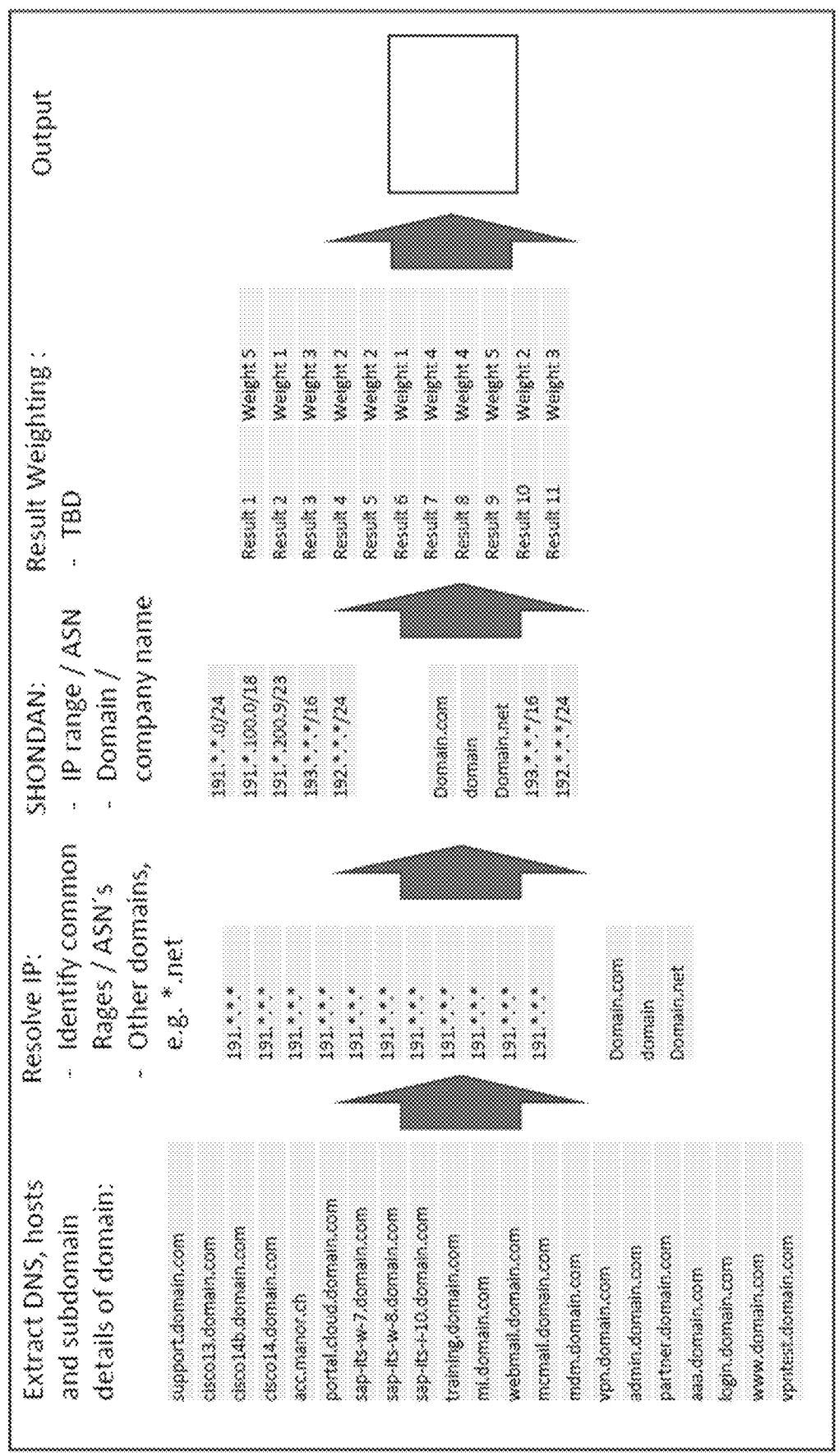
FIGS. 10 and 11 are diagrams illustrating details of the threat assessment process of FIG. 7.
Figure 11:
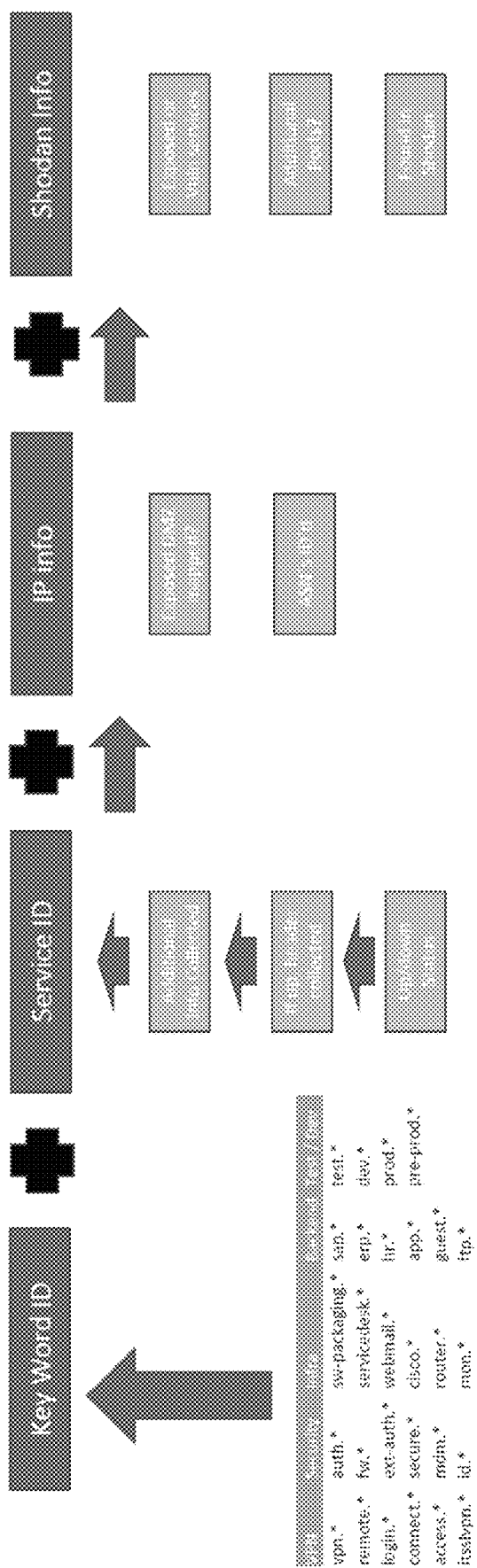
Figure 12:
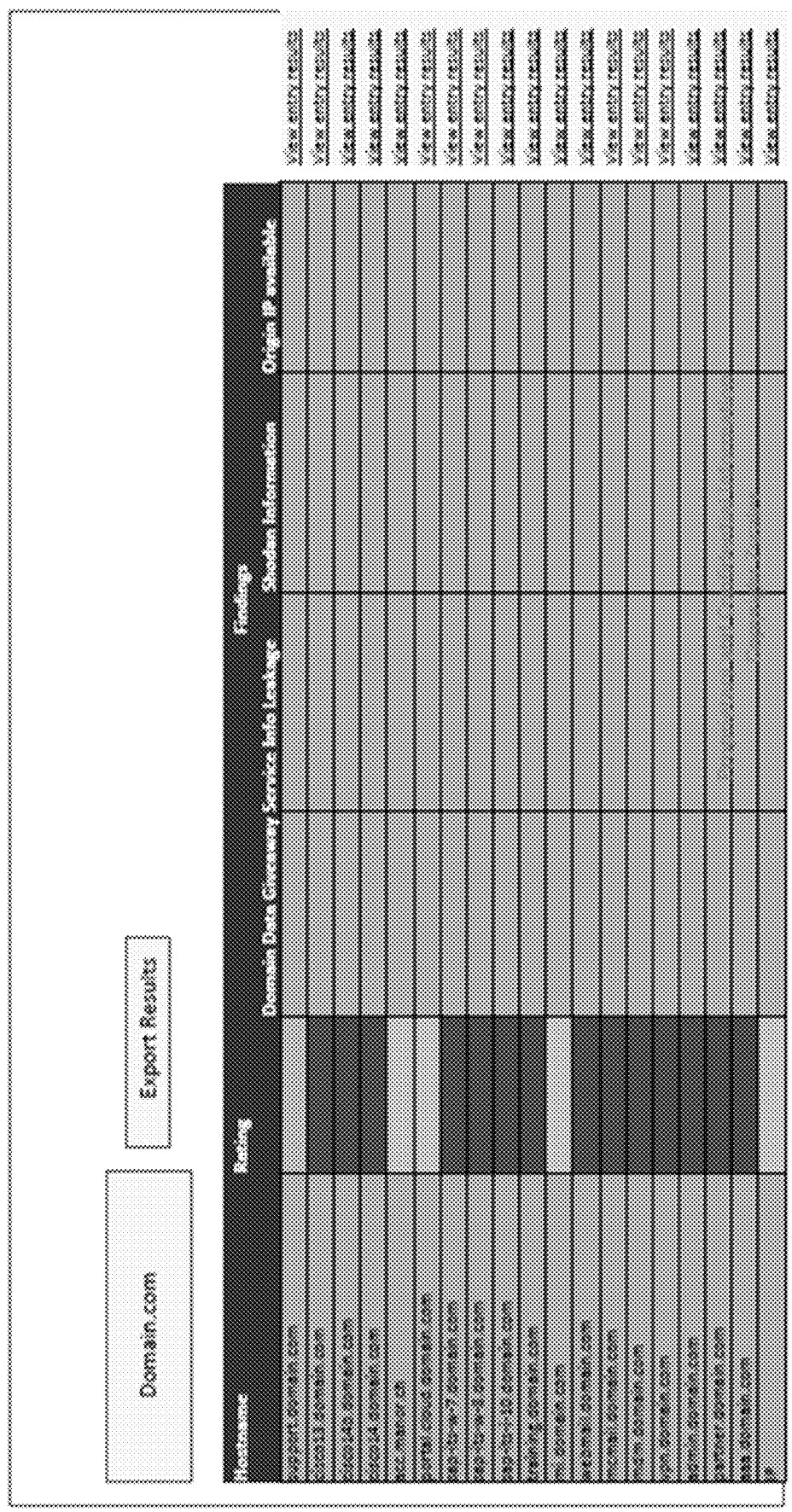
Figure 13:
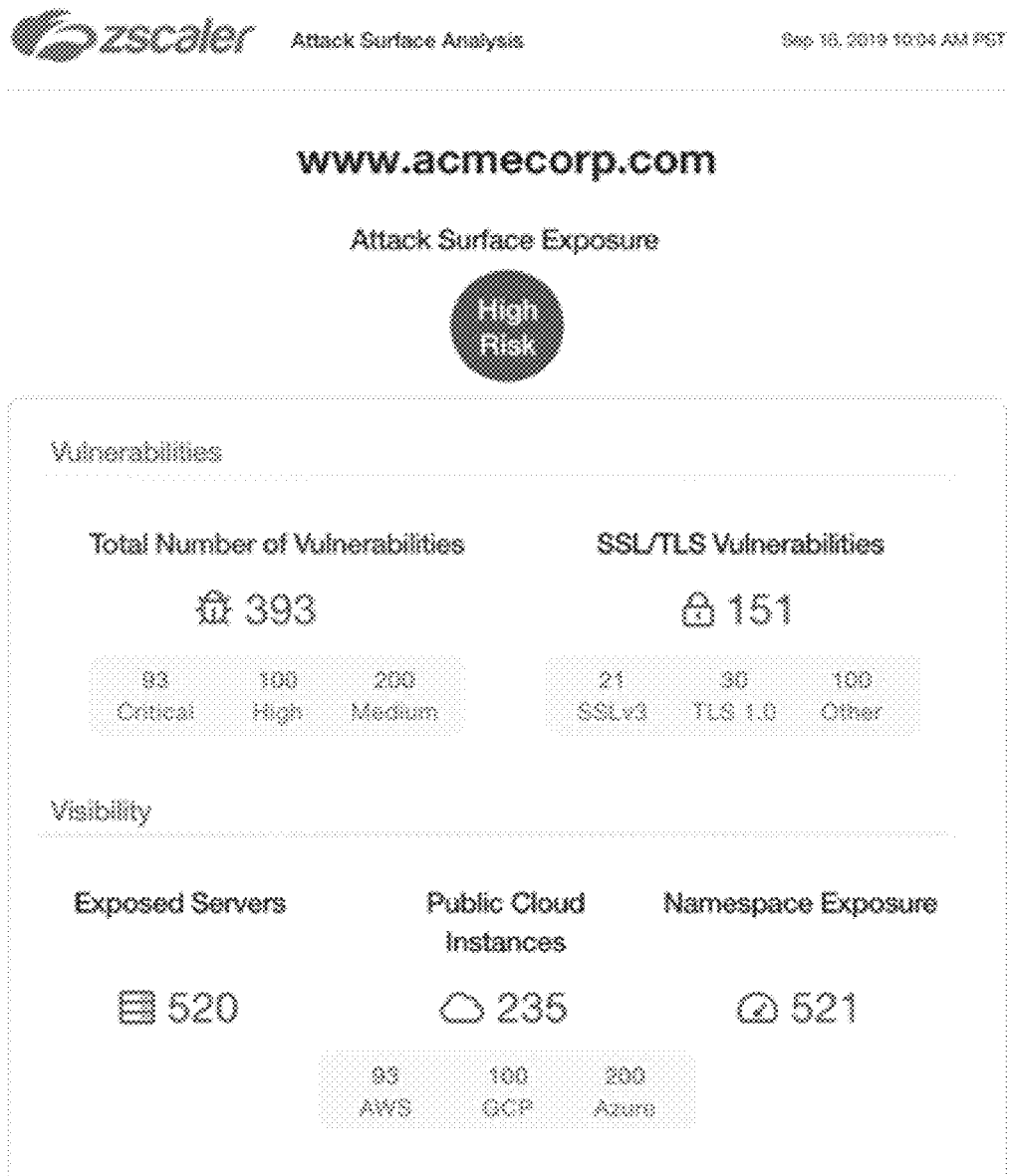

FIG. 7 is a flowchart of another threat assessment process 450. FIGS. 8 and 9 are screenshots of a User Interface (UI) for the threat assessment process 450. FIGS. 10 and 11 are diagrams illustrating details of the threat assessment process 450. FIGS. 12—14 are screenshots of an output UI for the threat assessment process 450. The threat assessment process 450 can be combined with the process 400, or performed separately. Also, as with the process 400, the threat assessment process 450 contemplates operation as a computer-implemented method, via the server 200, and/or as computer-readable code stored in a non-transitory computer-readable medium.

The threat assessment process 450 includes providing a landing page to a user for receiving a domain (step 451). For example, the landing page is shown in FIG. 8. Assume the user enters a value, e.g., abc.com, and selects submit.

Next, the threat assessment process 450 includes analysis, back end processing, and weighting (step 452). For example, a holding page is shown in FIG. 9 where the user is given information and optionally a status. Here, the user is told the threat assessment process 450 is searching the Internet for the domain.

FIG. 10 illustrates details of the threat assessment process 450 and the process 400, in a visual manner. Specifically, the DNS, hosts, and subdomain details are extracted of a domain. The IP address is resolved to identify ranges, ASNs, other domains, etc. Further, Shodan is used to identify IP ranges/ASN, domain, company name, etc. Finally, these results are combined in a weighting process to provide an output, as described herein.

FIG. 11 illustrates details of the weighting for threat assessment process 450 and the process 400. The weighting includes weights based on keywords in the hostname, as described herein. For example, the weighting can weight services that have more exposure, as described in the table above.

Service information can also be used. For example, identifying the hostname and then extracting the serice information from Shodan allows the tool to confirm that a VPN is a VPN or a Portal is a Portal, etc. This is done by using Shodan shodan data collected from the service headers. A header or banner is normally displayed upon connection and Shodan caches this, which we can then use to confirm that VPN.xyz.com is actually a VPN.

IP address info can be included. For example, an exposed demilitarized zone (DMZ) is a physical or logical subnetwork that contains and exposes an organization's external-facing services. The determination of an exposed DMZ can provide a negative value. For example, an exposed DMZ can point out customers IP addressing schemes, which IP addresses are assigned to the customers DMZ in the USA versus a production network in Germany, etc. It is also sadly possible to identify RFC1918 IP addresses in external DNS—this indicates a much larger issue at the company, normally completel mismanagement of DNS. ASN IDs allow confirmation of who owns the network space, e.g., the customer in question, or leased from a carrier, or a cloud service provider, etc.

Finally, CVE details can be included, e.g., from Shodan. This can include exposes or vulnerable services, exposed ports, CVE details from in Shodan, etc.

FIG. 12 illustrates an output UI in a tabular format. FIG. 13 illustrates an output UI for a single domain, e.g., www.acmecorp.com. Here, the attack surface exposure is listed as High Risk. Further, FIG. 13 illustrates details of found vulnerabilities, e.g., 393, including a breakdown of critical, high, and medium vulnerabilities. Further, the processes 400, 450 can enumerate specific Secure Sockets Layer (SSL) and Transport Layer Security (TLS) vulnerabilities. The process 400, 450 can also determine a number of exposed servers from the domain (e.g., 520), a public cloud instances number (e.g., 235, including a breakdown from different cloud providers), and namespace exposure (e.g., 521).

FIG. 14 illustrates additional details provided with the output UI from FIG. 13, including an explanation to the user on how the processes 400, 450 operate, namely by querying public sources for exposed servers, querying Shodan for vulnerabilities and TLS posture, and performing a service name keyword search. Finally, FIG. 14 can include assessment details, namely a list of known vulnerabilities existing in the domain's servers exposed to the Internet.

Security Assessment Testing

Figure 15:
FIG. 15 is a screenshot of a security preview assessment that can be implemented with the process of FIGS. 4 and 7.

In addition to testing the domain for threat assessments, the process 400, 450 can also perform various security and compliance tests as described herein. FIG. 15 is a screenshot of a security preview assessment that can be implemented with the process 400, 450. The following describes example tests for security and compliance. The goal of the security and compliance tests is to test the security stack that is currently tasked with protecting a corporate network and users. The tests fall into three categories: Threat Prevention, Access Control, and Data Protection. Of note, the test results can vary depending on your location or connection type which is different from the processes 400, 450. Mobile users may get different results depending on how they are accessing the Internet and if they are behind your security stack or not. It is recommended to perform these tests both on the corporate network and off to understand how results change depending on the connection.

Botnets—Once a device is compromised, it is no longer entirely under control—criminals can now direct it to exfiltrate network resources, infect other machines on the internal network, participate in Distributed Denial of Service (DDoS) attacks, email spam, spreading spyware, and other malicious attacks. This test tries to contact a known Botnet command and control server ('calling home') to determine if the internet security infrastructure will stop it.

Cross-site scripting (XSS)—XSS attacks can steal a web visitor's credentials and session keys (e.g., passwords and other sensitive data). This test visits a website that has been compromised by malicious code and checks to see if it is able to compromise a web browser.

Viruses—99% of anti-virus engines detect and block this common virus at the network level. This test checks to see if the infrastructure will block a virus coming from a Content Delivery Network (CDN), which is how most web content is delivered today.

Phishing—Criminals typically target phishing attacks at employees to steal corporate credentials or sensitive personal data. This test checks to see if a computer is able to access one of the latest validated phishing sites uncovered by Phishtank.com.

Malicious Sites—Hackers can launch zero day and 'watering hole' attacks by compromising legitimate sites with malicious code. This test checks to see if a security solution blocks a malicious page hosted on a compromised site.

Download EXE—Malware is often distributed through executable files downloaded from unknown websites or app stores. This test tries to download an executable file to test whether the system blocks, analyzes, or quarantines it.

Zipped Viruses—Criminals sometimes try to deliver their virus payloads using compressed/zipped files. Unzipping takes computational power that can slow traffic down, so many appliance-based security systems skip analyzing files zipped multiple times. This test attempts to download a file containing a virus that is zipped multiple times.

Cookie Hijacking—Cookie theft is the primary way criminals steal personal information such as logins to Gmail or corporate accounts on Oracle or Salesforce. This test takes a cookie from one website and tries to post it to a second one, a clear sign of an attempt to hijack the web session.

Data Leaks—Stealing customer data and intellectual property is the goal of some of the world's most dangerous hackers. This test checks to see if a security solution can detect and block attempts to leak sensitive data including credit card numbers and social security numbers by various online methods such as posting to a web site or emailing.

Anonymizers—Employees often try to bypass company policy by using anonymizing proxies that allow them to visit blacklisted websites, or view pornography or other harmful content. This test checks to see if your security solution allows you to use an anonymizing website by trying to visit a blacklisted website through a well-known anonymizer.

Embargoed Countries—Most companies wish to comply with US and EU trade laws and prevent users from visiting websites in countries that are under embargo. Additionally, compromised websites are often hosted in countries that are hostile to the United States and the European Union. This test checks the ability to visit a website located in an embargoed country, which is under US and EU Trade embargo.

Remediation

For blocking an EXE download, this test downloads an .exe file from a content delivery network (CDN) such as Akamai or AWS. CDNs are commonly used to serve files, so this is a standard delivery approach. If your organization allows .exe file downloads, then this test will fail, which would be expected. However, since .exe files are among the most dangerous file types to download, many organizations' security practices are set up to stop these downloads. The challenge of this test involves inspecting both suspicious and trusted traffic. CDNs like Akamai and AWS are often classified as trusted sources and exempt from file inspection. However, organizations should always inspect all traffic, because malicious content can be delivered over trusted traffic sources. Many security appliances have to employ certain tradeoffs to improve performance, such as allowing traffic from trusted sources, like CDNs, to go uninspected. Unfortunately, such tradeoffs leave easily exploitable gaps in your protection.

For remediation, to block these downloads, IT will need to identify the security appliance in the stack that should be blocking .exe files (often a Uniform Resource Locator (URL) filter or Next-generation Firewall (NGFW)), and adjust its policy to inspect trusted content. While many appliances struggle to balance traffic inspection and performance, the cloud-based system 100 is elastically scalable and provides as much performance as needed. One can get full inspection of every packet, even in SSL, without costly compromises.

For detecting common viruses encrypted over SSL, in this test, a benign file containing an EICAR virus test file is downloaded over SSL (HTTPS). Developed by the European Institute for Computer Antivirus Research (EICAR), this test file has been established by the industry as a "test virus." It really is not malicious, but it's been agreed upon by all security vendors to allow testing of their antivirus capabilities. In other words, if you're a security vendor, you should have a signature to block the EICAR file. The interesting aspect of this test is that the delivery is over an SSL connection. Since almost 90 percent of Internet traffic is now encrypted, SSL traffic inspection is a must. A majority of threats now hide in SSL traffic. If this test fails, the security stack is not inspecting SSL. To fix, SSL inspection must be enabled. This one step will close major gaps in defenses. SSL inspection may require certificate key management across gateways, as each gateway appliance will need certificates. Of note, SSL inspection will degrade performance. Performance issues are the main reasons why many entities do not inspect all SSL traffic with their appliances, as it can drastically reduce total bandwidth available for inspection SSL inspection requires a proxy architecture. While appliance proxies have the reputation of being slow, the cloud-based system provides a scalable proxy cloud service, providing the inherent security advantages of a proxy architecture without any of the performance concerns. One can inspect as much SSL traffic as needed. Also, one only has one place to apply certificates.

For blocking threats in known malicious websites, a benign object is attempted to be download from a known malicious domain. New malicious domains are identified thousands of times a day. When these sites are identified, they are updated into threat intelligence feeds and sent out for inclusion in vendors security solutions. The test does not download any malicious content; it only sees if access is allowed to known compromised sites tracked by various threat-sharing feeds. Malicious sites are commonly blocked with URL filtering. One should look to configure the URL filtering appliance in the security stack to update as frequently as possible. This way, access to highly suspicious domains will be blocked. Remember to do this test on the network and off, as results can change drastically based on location. The cloud-based system 100 can update signatures practically instantly, based on multi-tenant monitoring.

To detect a phishing attack, security defenses are tested to see if they can detect a phishing site. The phishing site will have been recently discovered and cataloged, so this test shows how up to date the defenses are. The test does not attempt to download any malicious content; it only gauges attempts to access the site. Much like the previous malicious domains test, a good security defense is only as good as the timeliness of its threat updates. Phishing is by far the most common attack vector and attackers have become a lot more sophisticated in their approaches. Often, their emails are difficult to distinguish from legitimate sources. Users clicking on malicious links in such emails should be protected, and ensuring that defenses are frequently updated is key. Remediation includes updating the frequency on a URL filtering appliance. Alternatively, the cloud-based system 100 can update signatures practically instantly, based on multi-tenant monitoring.

To stop a botnet callback, the test attempts to connect to a known botnet command-and-control (C&C) server and download a benign file. The server is selected from a safe browsing list, and the test does not send real information out. Botnet callbacks are a sign that devices on the network have been infected with malware and used as a backdoor. Used by the malware to receive instructions from a hacker, or to exfiltrate data, botnet callbacks help hackers persist within the network so they can continue with their malicious activities and spread laterally within the network. For remote users whose systems have been compromised, the hacker can begin to move laterally when the device connects back to the corporate network. If test fails, one needs to understand the path the test machine could take to the Internet, and determine that the security controls can detect and block botnet communications. Remember, there could be multiple paths to the Internet, and each route would need a security appliance in place that can identify and block botnet C&C activity. Finally, botnet callbacks can also hide in SSL traffic, further demonstrating the importance of SSL. Alternatively, the cloud-based system 100 can flush out unknown botnet communications, regardless of location.

To prevent XSS, this test visits a web server on a CDN that has been set up to simulate a cross-site scripting compromise. There is nothing in the test that is actually malicious. The test web server contains a script designed to try to exploit the browser used to connect to the web. Because the browser assumes the script is from a trusted source, it could run the script, which could then lead to a compromise of the browser's host machine. Hackers can often inject malicious code into trusted web sites that do not have proper security measures or that have certain vulnerabilities. This code then resides on the web server, waiting to strike an unsuspecting browser and infect the host machine. Many security appliances have limited resources, so inspection is only focused on portions of the URL and web content. One problem with this approach is that it can lead to overblocking cross-site attempts, which can impact the browsing experience. For example, there may be malicious content on facebook.com/profilename, however, with limited inspection the entire URL facebook.com. The cloud-based system 100 can block just the malicious script code on the web server.

To test the ability to stop older viruses, a portion of a well-known virus called Zbot is downloaded from a CDN. While the download is not completed, the portion is enough to trigger antivirus security, while causing no harm to the host system. The Zbot virus was first identified in 2007 and all security vendors should have a signature for it. If this test fails, there is either no antivirus solution, or it is is not inspecting content properly. The cloud-based system 100 is a complete security stack delivered as a service. With security services that range from Cloud Firewall/Intrusion Prevention System (IPS), Cloud Sandbox, Antivirus, Cloud DLP, and the like.

To block a virus hidden in a .zip file, in this test, a benign file containing an EICAR virus test file has been zipped multiple times and downloaded. This test file has been compressed with common archivers and it actually contains multiple benign files with the test EICAR virus. The EICAR virus is a test virus agreed upon by the security industry as a way to test the effectiveness of antivirus solutions. The point of this test is to see if the system can inspect the compressed file's contents. Because archive files can be nested, hackers will often try to hide a virus file inside archive files that have been compressed over and over again. Many streaming-based appliances, like firewalls, struggle to detect nested content in archive files, as certain archive file types (like RAR) can be inspected only after the complete file has been received. In order to properly inspect these types of files, one needs a proxy-based inspection architecture, which can assemble the complete file and inspect before delivery. Due to its proxy architecture, the cloud-based system 100 can scan multiple levels deep across all common archive files. This level of inspection covers most all use cases. Through organic file sharing, files can sometimes be compressed a few times; however, it seldom goes beyond that. In addition, users will not typically navigate through six levels of .zip files to access a file.

To prevent a common virus from a known malicious site, this test attempts to download the EICAR test file from the EICAR test site. Both the file and the site have been set up as a test for security vendors to evaluate their security effectiveness. All security vendors should have a signature for this EICAR test. If there is any level of security, this test should be easy to pass. The cloud-based system 100 provides a security service, following a user regardless of location.

To block content (adult, anonymizing websites, etc.), in these tests, connections are attempted to an anonymizing and an adult website, respectively, and a benign icon is downloaded from the adult website. Anonymizing websites and adult websites often go hand in hand, sharing a key concern: they open the door to the wild west of malicious content. While it is really no one's business how people spend their evenings, things change when using or connecting to company property. Anonymizers allow users to mask their identity when accessing the Internet, helping users to bypass corporate security policies such as blocking adult websites (and other restricted content). Adult sites can be a common vector that hackers use to sneak malware onto a corporate device and into the network.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
receiving a domain of interest; performing an analysis of the domain to extract namespaces of the domain, hosts associated with the domain, subdomains associated with the domain, namespaces of the subdomains, and addresses including address ranges of any identified namespaces; performing a Common Vulnerabilities and Exposures (CVE) search based on the analysis to identify a CVE list associated with the domain: performing one or more security tests, wherein the risk associated with the domain is based on the domain and the one or more security tests to provide a risk associated with a device, and wherein security tests are performed both on and off of a network to analyze changes dependent on the network connection;

determining weightings of the namespaces of the domain and the subdomains to provide a name list; obtaining cloud monitoring content associated with the domain; and utilizing the name list, the CVE list, the risk associated with the device, and the cloud monitoring content to determine a risk associated with the domain.

2. The non-transitory computer-readable storage medium of claim 1, wherein the steps further include displaying the risk in a summarized manner in a User Interface with associated details of the name list, the CVE list, and the cloud monitoring content; and providing one or more remediation actions based on the risk.

3. The non-transitory computer-readable storage medium of claim 1, wherein the weightings of the namespaces includes predetermine weights based on a hostname.

4. The non-transitory computer-readable storage medium of claim 1, wherein the addresses including the address ranges are utilized to identify exposed servers.

5. The non-transitory computer-readable storage medium of claim 1, wherein the analysis utilizes open source intelligence (OSINT) sources.

6. The non-transitory computer-readable storage medium of claim 1, wherein the analysis includes subdomain enumeration, reverse lookups, Autonomous System Name (ASN) lookup, and hosting lookup.

7. An apparatus comprising: a network interface communicatively coupled to a network; a processor communicatively coupled to the network interface; and memory storing computer-executable instructions that, when executed, cause the processor to receive a domain of interest; perform an analysis of the domain to extract namespaces of the domain, hosts associated with the domain, subdomains associated with the domain, namespaces of the subdomains, and addresses including address ranges of any identified namespaces; perform a Common Vulnerabilities and Exposures (CVE) search based on the analysis to identify a CVE list associated with the domain; performing one or more security tests, wherein the risk associated with the domain is based on the domain and the one or more security tests to provide a risk associated with a device, and wherein security tests are performed both on and off of a network to analyze changes dependent on the network connection:

determine weightings of the namespaces of the domain and the subdomains to provide a name list; obtain cloud monitoring content associated with the domain; and utilize the name list, the CVE list, the risk associated with the device, and the cloud monitoring content to determine a risk associated with the domain.

8. The apparatus of claim 7, wherein the instructions that, when executed, further cause the processor to cause display of the risk in a User Interface with associated details of the name list, the CVE list, and the cloud monitoring content; and provide one or more remediation actions based on the risk.

9. The apparatus of claim 7, wherein the weightings of the namespaces includes predetermine weights based on a hostname.

10. The apparatus of claim 7, wherein the addresses including the address ranges are utilized to identify exposed servers.

11. The apparatus of claim 7, wherein the analysis utilizes open source intelligence (OSINT) sources.

12. The apparatus of claim of claim 7, wherein the analysis includes subdomain enumeration, reverse lookups, Autonomous System Name (ASN) lookup, and hosting lookup.

13. A method comprising: receiving a domain of interest; performing an analysis of the domain to extract namespaces of the domain, hosts associated with the domain, subdomains associated with the domain, namespaces of the subdomains, and addresses including address ranges of any identified namespaces; performing a Common Vulnerabilities and Exposures (CVE) search based on the analysis to identify a CVE list associated with the domain;

performing one or more security tests wherein the risk associated with the domain is based on the domain and the one or more security tests to provide a risk associated with a device, and wherein security tests are performed both on and off of a network to analyze changes dependent on the network connection;

determining weightings of the namespaces of the domain and the subdomains to provide a name list; obtaining cloud monitoring content associated with the domain; and utilizing the name list, the CVE list, the risk associated with the device, and the cloud monitoring content to determine a risk associated with the domain.

14. The method of claim 13, further comprising displaying the risk in a User Interface with associated details of the name list, the CVE list, and the cloud monitoring content; and providing one or more remediation actions based on the risk.

15. The method of claim 13, wherein the weightings of the namespaces includes predetermine weights based on a hostname.

16. The method of claim 13, wherein the addresses including the address ranges are utilized to identify, exposed servers.

17. The method of claim 13, wherein the analysis utilizes open source intelligence (OSINT) sources.

18. The method of claim 13, wherein the analysis includes subdomain enumeration, reverse lookups, Autonomous System Name (ASN) lookup, and hosting lookup.

* * * * *